(12) United States Patent
Funkhouser (10) Patent No.: US 11,859,317 B2
(45) Date of Patent: Jan. 2, 2024

(54) PLUGGING DEVICES HAVING FILAMENTS COATED WITH SWELLABLE MATERIAL

(71) Applicant: THRU TUBING SOLUTIONS, INC., Oklahoma City, OK (US)

(72) Inventor: Gary P. Funkhouser, Moore, OK (US)

(73) Assignee: THRU TUBING SOLUTIONS, INC., Newcastle, OK (US)

( * ) Notice: Subject to any disclaimer, the term of this patent is extended or adjusted under 35 U.S.C. 154(b) by 130 days.

(21) Appl. No.: 17/113,169

(22) Filed: Dec. 7, 2020

(65) Prior Publication Data

US 2021/0171817 A1 Jun. 10, 2021

(51) Int. Cl.
*D02G 3/36* (2006.01)
*C09K 8/42* (2006.01)
*E21B 33/12* (2006.01)

(52) U.S. Cl.
CPC ............... *D02G 3/36* (2013.01); *C09K 8/426* (2013.01); *E21B 33/1208* (2013.01); *C09K 2208/08* (2013.01)

(58) Field of Classification Search
CPC .......... D02G 3/36; C09K 8/426; E21B 33/12; E21B 33/1208
See application file for complete search history.

(56) References Cited

U.S. PATENT DOCUMENTS

| | | | | |
|---|---|---|---|---|
| 2,977,748 A * | 4/1961 | Zisman | ................... | D07B 1/144 428/401 |
| 3,073,136 A * | 1/1963 | Dean | ........................ | D01D 7/00 65/447 |
| 3,778,994 A * | 12/1973 | Humphries | ............... | D07B 1/16 57/215 |
| 4,197,695 A * | 4/1980 | Hughes | ................... | D07B 7/145 156/48 |
| 4,707,977 A * | 11/1987 | Cousin | ..................... | D02G 3/40 57/295 |
| 5,264,251 A * | 11/1993 | Geursen | ............... | G02B 6/4434 427/389.9 |
| 5,362,326 A * | 11/1994 | Hasui | ..................... | D07B 7/145 118/325 |

(Continued)

FOREIGN PATENT DOCUMENTS

WO 2014130293 A1 8/2014

OTHER PUBLICATIONS

Canadian Examiner's Report dated Jan. 26, 2022 for CA Patent Application No. 3,100,651, 3 pages.

(Continued)

*Primary Examiner* — Shaun R Hurley
(74) *Attorney, Agent, or Firm* — Smith IP Services, P.C.

(57) ABSTRACT

A method of constructing a plugging device can include incorporating multiple filaments into the plugging device, and coating each individual filament with a swellable material. A plugging device for use in a subterranean well can include a body comprising multiple filaments, and a swellable material on each of the individual filaments. A system can include a plugging device conveyed by fluid flow into engagement with an opening, whereby the plugging device blocks flow through the opening. The plugging device can include multiple filaments, each of the multiple filaments being coated with a swellable material. The swellable material may seal against a surface of the opening.

7 Claims, 6 Drawing Sheets

(56) References Cited

U.S. PATENT DOCUMENTS

| | | | |
|---|---|---|---|
| 5,817,713 A | 10/1998 | Pappas et al. | |
| 6,270,845 B1 | 8/2001 | Pappas et al. | |
| 6,287,679 B1 | 9/2001 | Pappas et al. | |
| 8,656,696 B2 * | 2/2014 | Bruch | B66B 7/062 57/232 |
| 2012/0144795 A1 * | 6/2012 | Knappe | B29C 70/521 57/232 |
| 2014/0102728 A1 * | 4/2014 | Gamstedt | E21B 33/02 166/387 |
| 2014/0120346 A1 | 5/2014 | Rochen | |
| 2014/0231086 A1 | 8/2014 | Jamison et al. | |
| 2015/0167443 A1 | 6/2015 | Litvinets et al. | |
| 2017/0260828 A1 | 9/2017 | Watson et al. | |
| 2019/0257172 A1 * | 8/2019 | Watson | E21B 33/13 |

OTHER PUBLICATIONS

Fiberline; "Water Blocking Yarn", product data article, dated 2019, 3 pages.
International Search Report with Written Opinion dated Sep. 7, 2020 for PCT Patent Application No. PCT/JS2019/065157, 15 pages.

* cited by examiner

PLUGGING DEVICES HAVING FILAMENTS COATED WITH SWELLABLE MATERIAL

CROSS-REFERENCE TO RELATED APPLICATION

This application claims priority under 35 USC § 119 to International Application No. PCT/US19/65157 filed on 9 Dec. 2019. The entire disclosure of this prior application is incorporated herein by this reference.

BACKGROUND

This disclosure relates generally to equipment utilized and operations performed in conjunction with a subterranean well and, in examples described below, more particularly provides plugging devices having filaments coated with swellable material.

It can be useful to be able to control fluid flow through selected perforations or other openings in a well. For example, flow diverters or plugging devices may be used to restrict or prevent flow of a treatment fluid (such as, a fracturing fluid, acid, conformance agent, permeability modifier, etc.) into perforations that have already received adequate amounts of the treatment fluid. In this manner, the treatment fluid will be diverted to other perforations that have not yet received adequate amounts of the treatment fluid.

Therefore, it will be appreciated that improvements are continually needed in the art of constructing and utilizing plugging devices for controlling flow through openings in wells. Such improvements may be useful in a variety of different situations, including situations other than those in which it is desired to prevent flow of a treatment fluid into perforations that have received treatment fluid therein.

DETAILED DESCRIPTION

Figure 1:
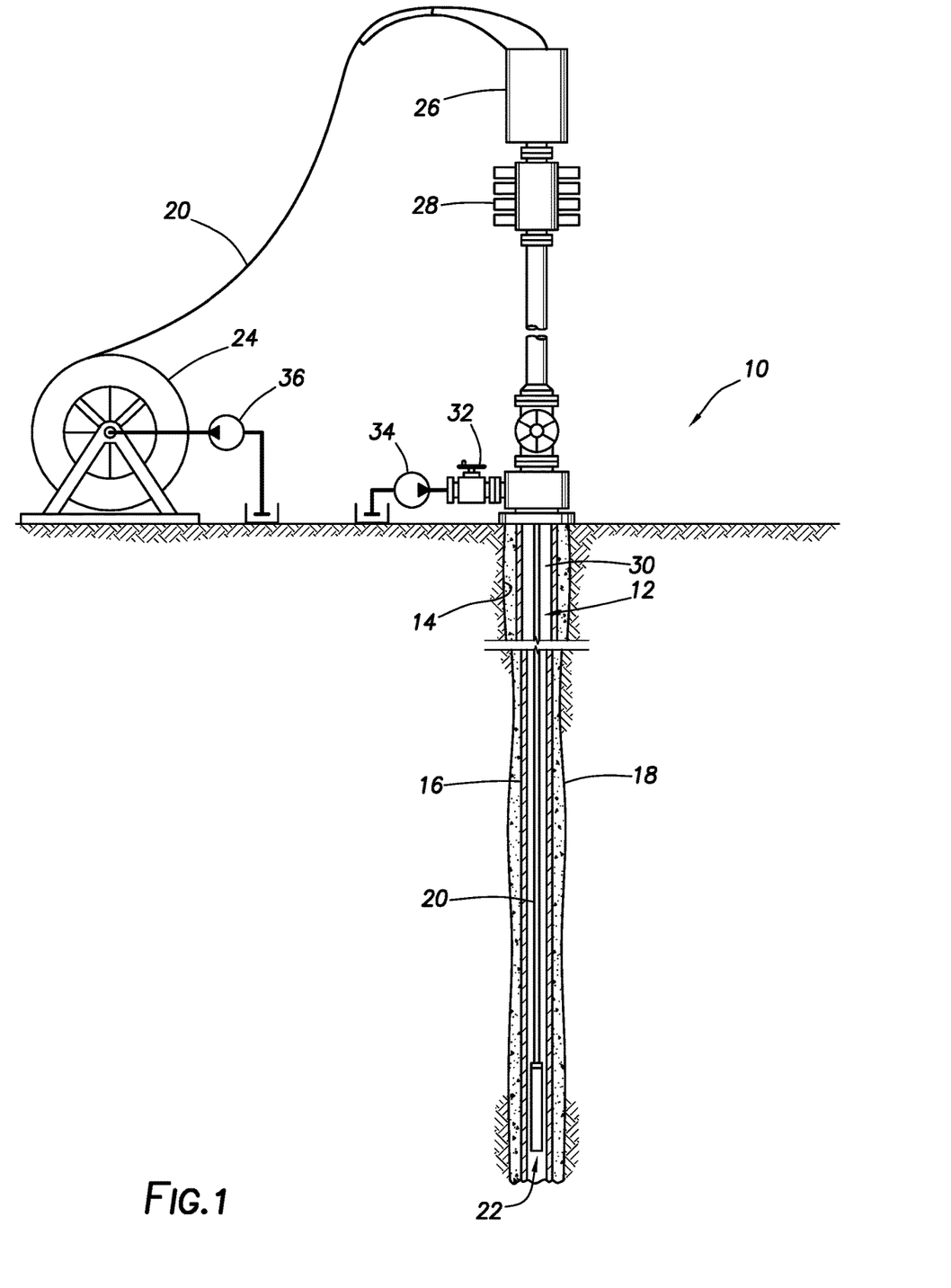
FIG. 1 is a representative partially cross-sectional view of an example of a well system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is conveyed into a wellbore 14 lined with casing 16 and cement 18. Although multiple casing strings would typically be used in actual practice, for clarity of illustration only one casing string 16 is depicted in the drawings.

Although the wellbore 14 is illustrated as being vertical, sections of the wellbore could instead be horizontal or otherwise inclined relative to vertical. Although the wellbore 14 is completely cased and cemented as depicted in FIG. 1, any sections of the wellbore in which operations described in more detail below are performed could be uncased or open hole. Thus, the scope of this disclosure is not limited to any particular details of the system 10 and method.

The tubular string 12 of FIG. 1 comprises coiled tubing 20 and a bottom hole assembly 22. As used herein, the term "coiled tubing" refers to a substantially continuous tubing that is stored on a spool or reel 24. The reel 24 could be mounted, for example, on a skid, a trailer, a floating vessel, a vehicle, etc., for transport to a wellsite. Although not shown in FIG. 1, a control room or cab would typically be provided with instrumentation, computers, controllers, recorders, etc., for controlling equipment such as an injector 26 and a blowout preventer stack 28.

As used herein, the term "bottom hole assembly" refers to an assembly connected at a distal end of a tubular string in a well. It is not necessary for a bottom hole assembly to be positioned or used at a "bottom" of a hole or well.

When the tubular string 12 is positioned in the wellbore 14, an annulus 30 is formed radially between them. Fluid, slurries, etc., can be flowed from surface into the annulus 30 via, for example, a casing valve 32. One or more pumps 34 may be used for this purpose. Fluid can also be flowed to surface from the wellbore 14 via the annulus 30 and valve 32.

Fluid, slurries, etc., can also be flowed from surface into the wellbore 14 via the tubing 20, for example, using one or more pumps 36. Fluid can also be flowed to surface from the wellbore 14 via the tubing 20.

In the further description below of the example of FIGS. 7 & 8, one or more flow conveyed plugging devices are used to block or plug openings in the system 10 of FIG. 1. However, it should be clearly understood that these methods and the plugging device may be used with other systems, and the plugging device may be used in other methods in keeping with the principles of this disclosure.

The example methods described below allow existing fluid passageways to be blocked permanently or temporarily in a variety of different applications. Certain plugging device examples described below are made of a filament material and may comprise a central body, a "knot" or other enlarged geometry.

The plugging devices may be conveyed into the passageways or leak paths to be plugged using pumped fluid. Filaments, yarn or twine extending outwardly from a body of a device can "find" and follow the fluid flow, pulling the enlarged geometry and/or filaments into a restricted portion of a flow path, causing the enlarged geometry and additional strands to become tightly wedged into the flow path, thereby sealing off fluid communication.

The plugging devices can comprise degradable or non-degradable materials. The degradable materials can be either self-degrading, or can require degrading treatments, such as, by exposing the materials to certain acids, certain base compositions, certain chemicals, certain types of radiation (e.g., electromagnetic or "nuclear"), or elevated temperature. The exposure can be performed at a desired time using a form of well intervention, such as, by spotting or circulating a fluid in the well so that the material is exposed to the fluid.

In some examples, the material can be an acid degradable material (e.g., nylon, etc.), a mix of acid degradable materials (for example, nylon fibers mixed with particulate such as calcium carbonate), self-degrading material (e.g., polylactic acid (PLA), poly-glycolic acid (PGA), etc.), material that degrades by galvanic action (such as, magnesium alloys, aluminum alloys, etc.), a combination of different self-degrading materials, or a combination of self-degrading and non-self-degrading materials.

In certain examples described below, the plugging device can be made of knotted filament materials. Multiple knots can be used with any number of loose ends. The ends can be splayed outward. The filament material can be incorporated into twine, rope, fabric, metal wool, cloth or another woven or braided structure.

The plugging device can be used to block open sleeve valves, perforations or any leak paths in a well (such as, leaking connections in casing, corrosion holes, etc.). Any opening or passageway through which fluid flows can be blocked with a suitably configured plugging device. For example, an intentionally or inadvertently opened rupture disk, or another opening in a well tool, could be plugged using the plugging device.

In some examples, the bottom hole assembly 22 can comprise a perforator that is used to form perforations through the casing 16 and cement 18. In this manner, fluid communication is established between an interior of the casing 16 and an earth formation penetrated by the wellbore 14. Plugging devices can be used to control the flow of fluid (such as a treatment fluid) through some or all of the perforations.

Figure 2:
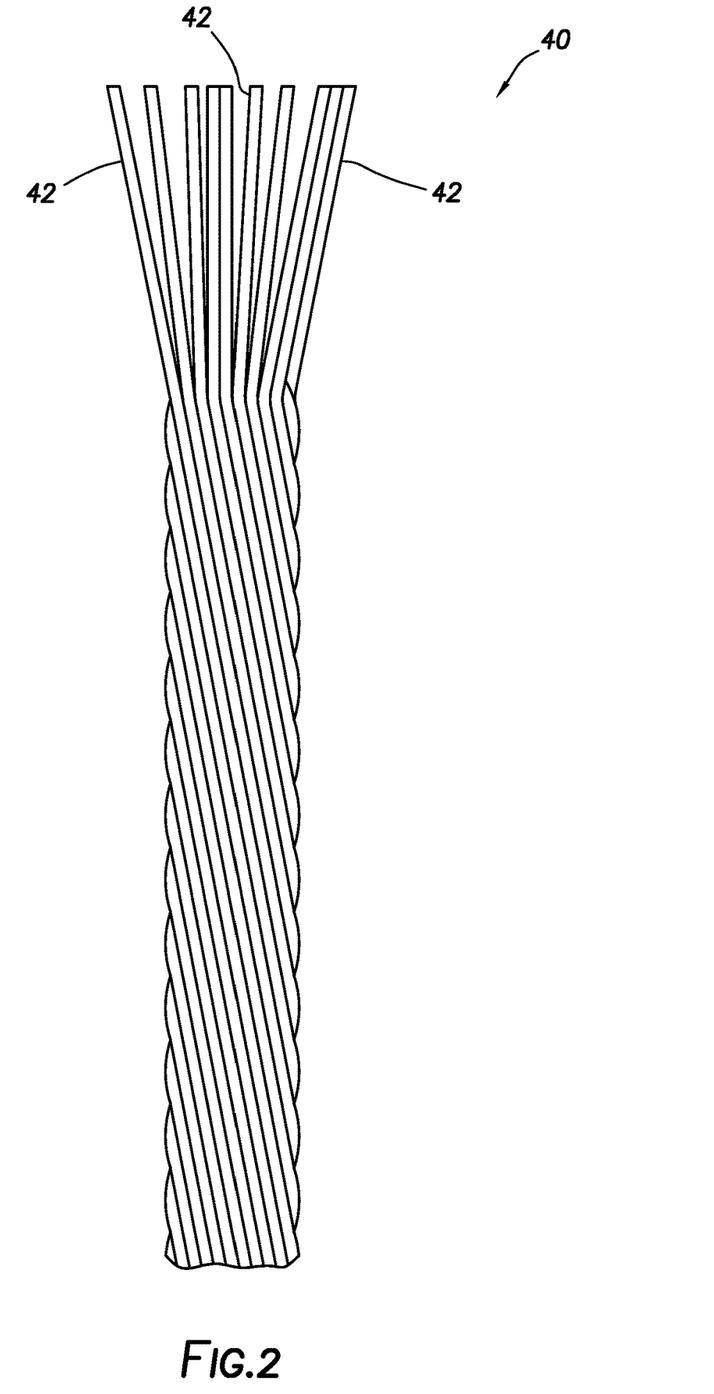
FIG. 2 is a representative side view of an example of a filament yarn that may be used in a plugging device incorporating the principles of this disclosure.

Referring additionally now to FIG. 2, an example of a filament yarn 40 is representatively illustrated. The filament yarn 40 may be used to construct a plugging device for use in the FIG. 1 well system 10 and method, or it may be used to construct plugging devices for use with other systems or methods.

In the FIG. 2 example, the yarn 40 comprises multiple continuous filaments 42 that are twisted together to form the yarn. In other examples, the filaments 42 may not be twisted together to form the yarn 40. The filaments 42 and yarn 40 can be either be as spun, or texturized. Texturizing may be accomplished by imparting a "false twist" or by air entanglement. Any number of filament(s) 42 may be used in the yarn 40, the filaments are not necessarily continuous, and the filaments are not necessarily twisted together, in other examples.

The filaments 42 may be formed from a variety of different materials. These materials include, but are not limited to, polyethylene terephthalate (PET), nylon, acrylics, polyurethanes, polypropylene, rayon, aramid, modacrylic, olefin, polyester, saran, polylactic acid (PLA), polyether ether ketone (PEEK), polyphenylene sulfide, etc. Each filament 42 could comprise a combination of different materials in some examples.

If multiple filaments 42 are used in the yarn 40, then the different filaments may comprise respective different materials. The scope of this disclosure is not limited to use of any particular material or combination of materials for the filaments 42.

In some examples, the yarn 40 can be used to produce a rope or twine (see FIG. 5) as an intermediate step in constructing a plugging device. In that case, multiple strands of yarn 40 may be braided together to form the twine, and the twine (or multiple twines) may then be used to form the plugging device.

Figure 3:
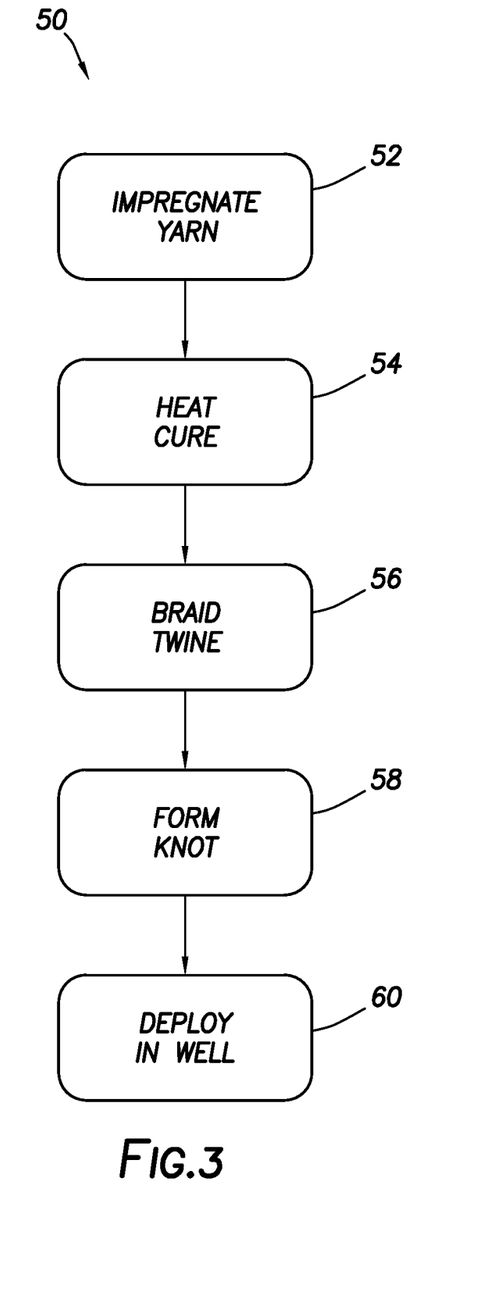
FIG. 3 is a representative flowchart for an example method of producing the plugging device.

Referring additionally now to FIG. 3, a flowchart for an example method 50 of producing a plugging device is representatively illustrated. In this example, a certain configuration of the plugging device is produced, but it will be appreciated by those skilled in the art that different plugging device configurations may be produced using certain steps of the method 50, without departing from the principles of this disclosure.

Figure 8:
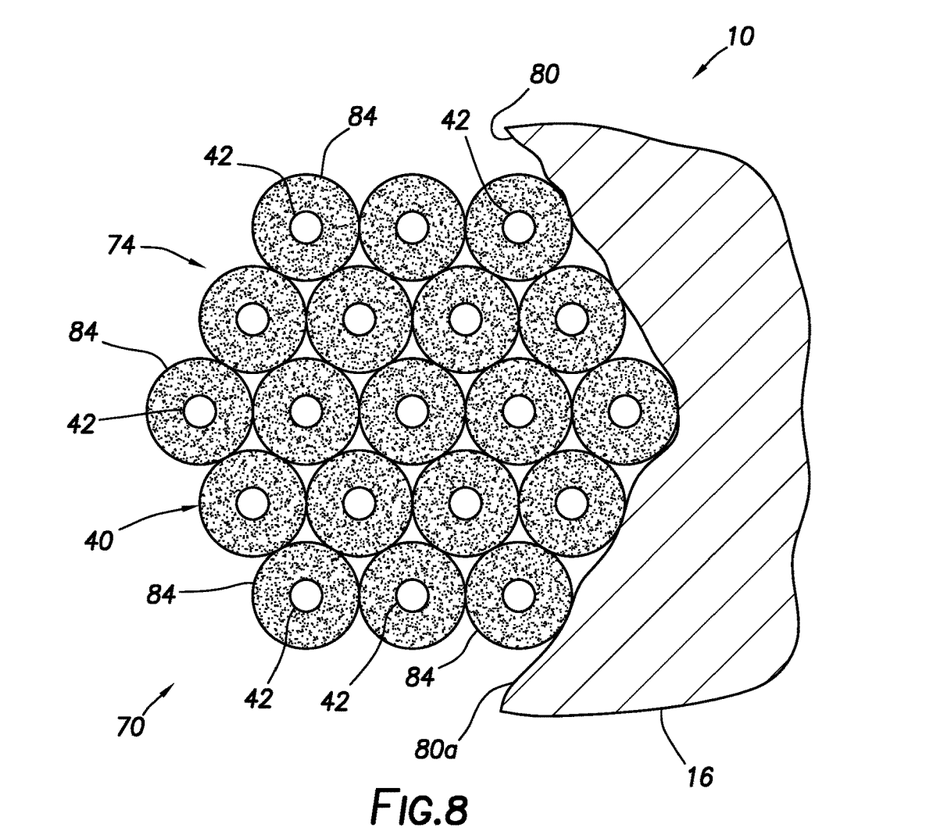
FIG. 8 is a representative cross-sectional view of the filament yarn sealed against a surface of the opening.

In step 52, a yarn (such as, the FIG. 2 filament yarn 40) is impregnated with a swellable material (see FIG. 8). In this example, the swellable material is selected so that it swells (increases in volume) in response to contact with water in a well. Each of the filaments 42 of the yarn 40 is coated with the swellable material in the impregnating step 52.

A suitable water-swellable polymer for use as the swellable material is sodium polyacrylate. In order to facilitate the impregnating of the yarn 40, the sodium polyacrylate may be dispersed in a polyvinyl chloride (PVC) plastisol resin matrix, so that the material coats the individual filaments 42.

In other examples, the swellable material could swell in response to other types of stimuli. The swellable material could swell in response to contact with a particular swelling agent in the well, such as, hydrocarbons or a fluid having a selected pH range. The swellable material could swell in response to exposure to elevated temperature in the well. The swellable material could swell in response to passage of time. Thus, the scope of this disclosure is not limited to any particular technique, mechanism or stimulus for causing the swellable material to swell.

Additional suitable swellable materials include the following:
1. Poly(acrylic acid), crosslinked, sodium or potassium salt thereof;
2. Poly(acrylic acid-co-acrylamide), crosslinked, sodium or potassium salt thereof;
3. Poly(acrylic acid), sodium or potassium salt-graft-poly (ethylene oxide), crosslinked;
4. Poly(2-hydroxyethyl methacrylate);
5. Poly(2-hydroxyethyl acrylate);
6. Starch;
7. Starch grafted with acrylic acid or methacrylic acid, sodium or potassium salt thereof;
8. Water-swellable clay (e.g., sodium bentonite); and
9. Cellulose derivatives (e.g., hydroxyethylcellulose).

In step 54, the impregnated yarn 40 is heat cured. Application of heat binds the swellable material coating to the filaments 42 of the yarn 40.

In step 56, the yarn 40 is braided to form a twine. The term "twine" is used herein to indicate a string or rope formed of multiple strands braided or twisted together.

Figure 5:
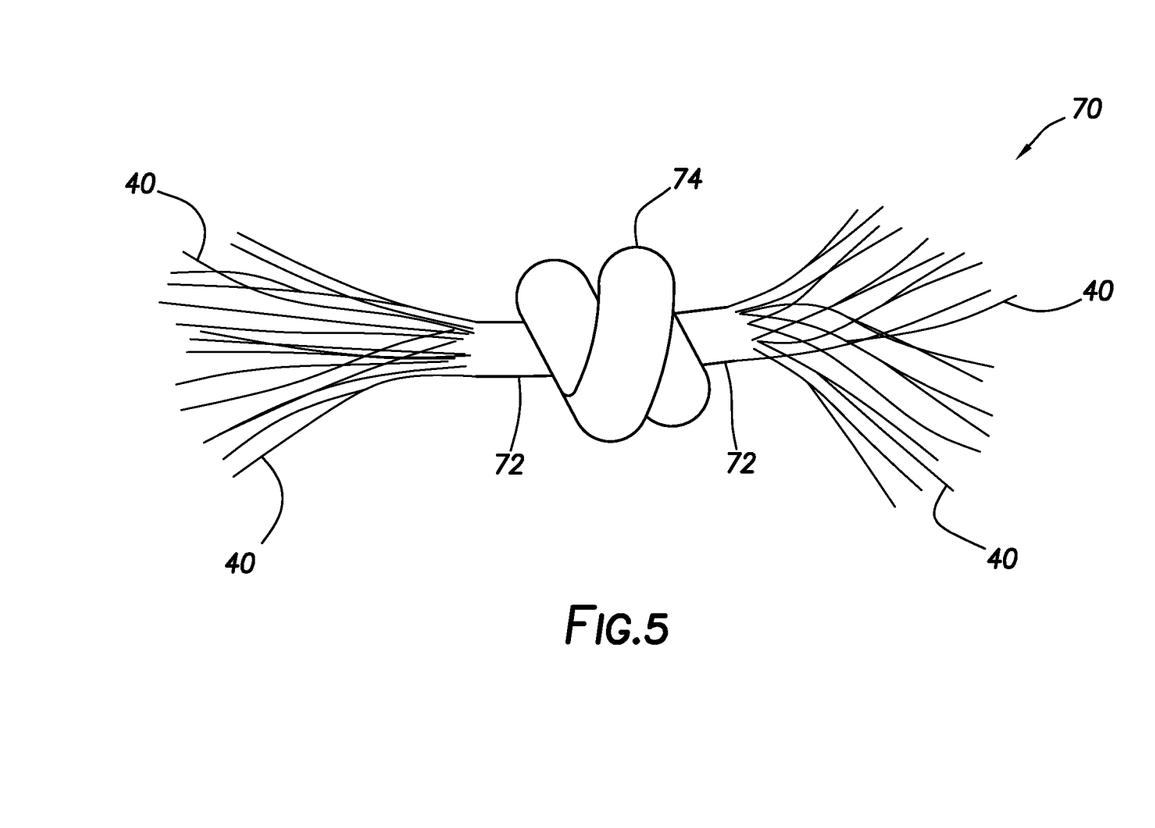
FIG. 5 is a representative side view of an example of the plugging device.

In step 58, the twine is knotted to form an enlarged body of the plugging device (see FIG. 5). A knot may be formed in the twine by interlacing ends of the twine, so that a compact bundle, knob or knot in the twine serves as the body of the plugging device.

In step 60, after the plugging device has been produced, it is deployed into a well. In the FIG. 1 system 10 and method, one or more plugging devices may be deployed into the wellbore 14 to plug or block fluid flow through perforations formed in the casing 16 and cement 18.

The plugging devices may be deployed into the wellbore 14 before or after the perforations are formed. The plugging devices may be individually or collectively deployed into the wellbore 14 from a surface location, or the plugging devices may be conveyed into the wellbore in a container (for example, as a component of the bottom hole assembly 22) and then released from the container downhole. The scope of this disclosure is not limited to any particular method for deploying the plugging devices into a well.

Figure 4:
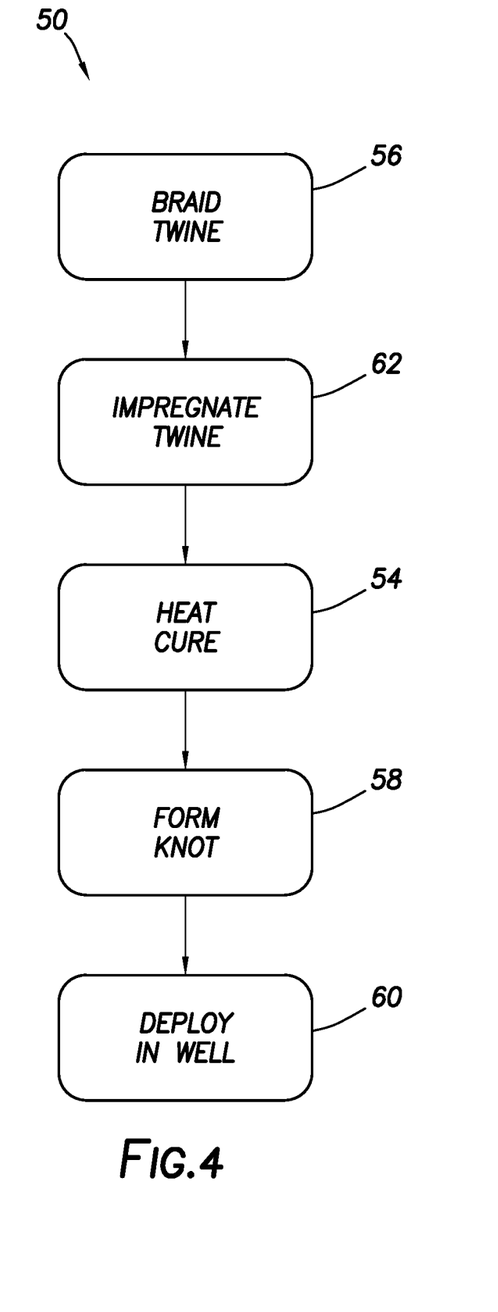
FIG. 4 is a representative flowchart for another example method of producing the plugging device.

Referring additionally now to FIG. 4, another example flowchart for the method 50 is representatively illustrated. In this example, the steps 54, 56, 58, 60 of the FIG. 3 method 50 are used, but the steps are performed in a different order.

In the FIG. 4 method 50, the yarn 40 is braided to form the twine in step 56, and then the twine is impregnated with the swellable material in step 62. This step 62 is similar to the step 52 of the FIG. 3 method, except that the filaments 42 of the yarn 40 are coated with the swellable material after the twine is formed from the yarn.

In order to ensure that each of the individual filaments 42 is coated with the swellable material, the impregnating step 62 may be performed after a vacuum has been applied to the twine. For example, the twine could be placed in a vacuum chamber or flexible enclosure, a vacuum could be applied to the chamber or enclosure, and then the swellable material could be introduced into the chamber or enclosure. After the twine is impregnated with the swellable material, the steps 54, 58 and 60 are performed to bind the swellable material to the filaments 42, form the knot and then deploy the plugging device 70 into the well.

Referring additionally now to FIG. 5, an example of a plugging device 70 that the method 50 may be used to produce is representatively illustrated. However, it should be understood that other plugging device configurations could be produced by the method 50 examples described herein, in keeping with the principles of this disclosure.

In the FIG. 5 example, multiple strands of the yarn 40 are braided together to form a rope or twine 72. An enlarged body 74 of the plugging device 70 is formed by knotting the twine 72, such as, by interlacing ends of the twine to form a compact knot (for example, a double overhand knot or other type of knot).

A size of the knot is selected so that the knot or the body 74 will engage but not pass through an opening in the well. For example, if it is desired to prevent flow through a perforation in the well, the body 74 can be configured so that it has an outer dimension that is larger than a diameter of the perforation. In this manner, the plugging device 70 can engage the perforation or other opening and block flow of fluid through the opening.

As depicted in FIG. 5, the strands of yarn 40 are splayed outward at ends of the twine 72. This configuration increases fluid drag on the plugging device 70, so that the plugging device is carried with fluid flow to an opening which it is desired to plug. Even more fluid drag may be produced by splaying outward the individual filaments 42 of the yarn 40 at the ends of the twine 72.

However, it is not necessary for the strands of yarn 40 to be splayed outward at the ends of the twine 72. For example, the twine itself extending outwardly from the body 74 may be sufficient to produce a desired amount of fluid drag on the plugging device 70.

Figure 6:
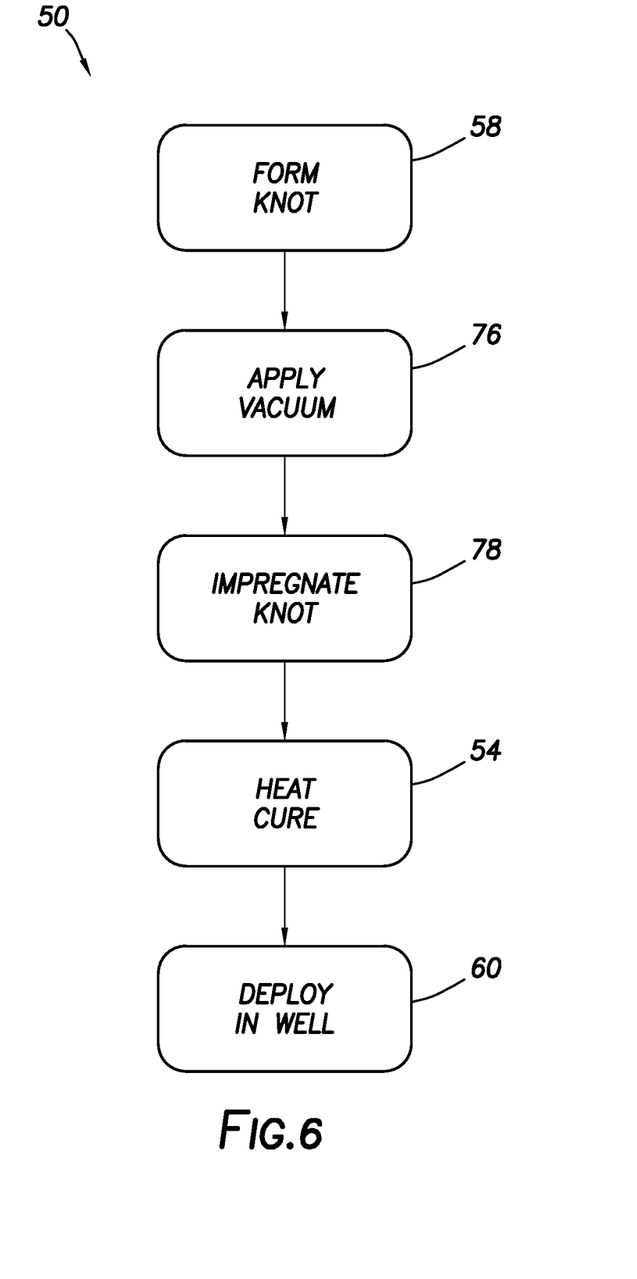
FIG. 6 is a representative flowchart for another example method of producing the plugging device.

Referring additionally now to FIG. 6, another example flowchart for the method 50 is representatively illustrated. In this example, the knot is formed in the step 58 prior to impregnating the knot with the swellable material in a step 78.

The knot may be formed as described above for the FIGS. 3 & 4 examples. The yarn 40 is braided to form the twine 72 (see step 56) and the resulting twine is used to form the knot or body 74 of the plugging device 70 in this example.

As depicted in FIG. 6, a vacuum is applied to the plugging device 70 after the knot or body 74 is formed in step 76. This is similar to the technique described above in relation to impregnating the twine 72 in the FIG. 4 example. However, in the FIG. 6 method 50, the knot is formed prior to the vacuum being applied to the plugging device 70. The plugging device 70 could be placed in a vacuum chamber or flexible enclosure, a vacuum could be applied to the chamber or enclosure, and then the swellable material could be introduced into the chamber or enclosure.

In step 78, the knot is impregnated with the swellable material. If the technique described above is used (e.g., a vacuum is applied to the entire plugging device 70), then the entire plugging device can be impregnated with the swellable material. Preferably, each of the individual filaments 42 in at least the knot or body 74 of the plugging device 70 is coated with the swellable material as a result of this step 78. After the knot is impregnated with the swellable material, the steps 54 and 60 are performed to bind the swellable material to the filaments 42 and then deploy the plugging device 70 into the well.

Figure 7:
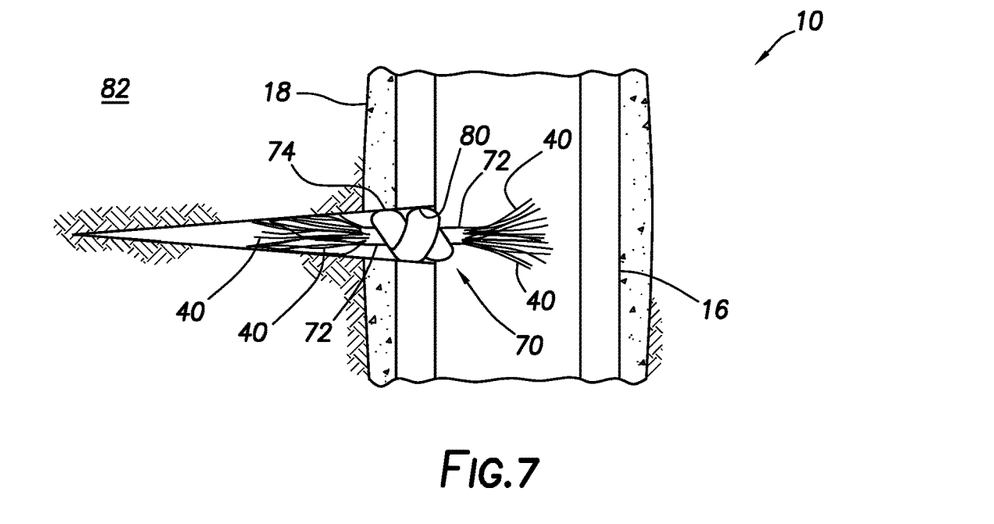
FIG. 7 is a representative partially cross-sectional view of the plugging device engaged with an opening in a subterranean well.

Referring additionally now to FIG. 7, the plugging device 70 is representatively illustrated in the well system 10 and method after the plugging device has engaged an opening 80 in the well. In this example, the plugging device 70 is deployed into the well and is conveyed into engagement with the opening 80 by fluid flow in the well. The twine 72 and yarn 40 extending outwardly from the body 74 enhances fluid drag on the plugging device 70, so that it is conveyed by the flow to the opening 80 (through which the fluid flows prior to the plugging device engaging the opening).

The plugging device 70 engages the opening 80, but the body 74 of the plugging device 70 is too large to permit the plugging device 70 to pass through the opening. In this manner, the plugging device 70 blocks flow through the opening 80.

The opening 80 in the FIG. 7 example is in the form of a perforation formed through the casing 16 and cement 18. The perforation provides fluid communication between an interior of the casing 16 and an earth formation 82. Other types of openings may be blocked by the plugging device 70 in other examples.

The plugging device 70 includes features that enhance the engagement between the plugging device and the opening 80, so that the plugging device can more effectively prevent fluid flow through the opening. For example, the use of the swellable material on the filaments 42 of the yarn 40 can enable the plugging device 70 to sealingly engage a surface of the opening 80, and can provide for sealing between the filaments so that leakage of fluid through the plugging device itself is prevented, thereby decreasing a permeability of the plugging device.

Referring additionally now to FIG. 8, an enlarged scale cross-sectional view of engagement between the plugging device 70 and the opening 80 is representatively illustrated. In this view, one of the yarns 40 of the plugging device body 74 is depicted in contact with a surface 80a of the opening 80. The yarn 40 shown in FIG. 8 could instead be part of the twine 72 extending outwardly from the body 74. Thus, it will be appreciated that portions of the plugging device 70 other than the body 74 can engage and seal against the surface 80a of the opening 80.

As described above, each of the filaments 42 is coated with a swellable material 84. After the plugging device 70 is deployed into the well, the swellable material 84 swells. For example, the swellable material 84 may be contacted by a suitable swelling agent (such as, water, hydrocarbons, a fluid having a particular pH range, etc.) or may experience another type of stimulus (such as, heat, passage of time, etc.), which causes the swellable material to swell.

In the FIG. 8 example, the swellable material 84 has swollen and sealingly engages the inner surface 80a of the opening 80. In this manner, the ability of the plugging device 70 to effectively block flow through the opening 80 is significantly enhanced, especially in circumstances in which the surface 80a of the opening is irregularly shaped as depicted in FIG. 8.

In addition, the swellable material 84 on each of the filaments 42 sealingly contacts the swellable material on adjacent filaments, thereby sealing between the filaments. This prevents fluid flow through the plugging device 70 itself, thereby decreasing a permeability of the plugging device.

Note that the swellable material 84 may swell before or after the plugging device 70 engages the opening 80. A swelling agent that causes the swellable material 84 to swell may be present in the well when the plugging device 70 is deployed into the well, or it may be introduced into the well after the plugging device is deployed or after the plugging device engages the opening 80.

As mentioned above, the plugging device 70 may comprise a degradable material. After it is no longer desired for the plugging device 70 to block flow through the opening 80 (such as, when it is desired to produce fluid from the formation 82), all or a portion of the plugging device may degrade, so that it can no longer block flow through the opening. For example, the filaments 42, the swellable material 84 or both of them may comprise a degradable material.

Any technique or mechanism for degrading a material of the plugging device 70 may be used, including but not limited to those described in US Publication No. 2017/0260828, the entire disclosure of which is incorporated herein by this reference for all purposes. Alternatively, the plugging device 70 could be dislodged from the opening 80 by production fluid flow from the formation 82 or by mechanical means, including but not limited to those described in U.S. Pat. No. 9,920,589, the entire disclosure of which is incorporated herein by this reference for all purposes.

It may now be fully appreciated that the above disclosure provides significant advancements to the art of constructing and utilizing plugging devices for controlling flow through openings in wells. In some examples described above, individual filaments 42 of a plugging device 70 are coated with a swellable material 84. The swellable material 84 swells in the well, so that sealing is enhanced between the individual filaments 42 and/or between the filaments 42 and a surface 80a of an opening 80.

The above disclosure provides to the art a method 50 of constructing a plugging device 70 for use in a subterranean well. In one example, the method 50 can comprise: incorporating multiple filaments 42 into the plugging device 70, and coating each individual filament 42 with a swellable material 84.

In any of the examples described herein:

The incorporating step may include incorporating the filaments 42 into multiple strands of yarn 40.

The incorporating step may include forming a twine 72 with the multiple strands of yarn 40.

The coating step may include coating the filaments 42 after the twine 72 forming step.

The method may include forming a knot in the twine 72.

The coating step may include coating the filaments 42 after the knot forming step.

The swellable material 84 may comprise a water-swellable material.

The swellable material 84 may swell in the well.

Also described above is a plugging device 70 for use in a subterranean well. In one example, the plugging device 70 can comprise: a body 74 comprising multiple filaments 42, and a swellable material 84 on each of the individual filaments 42.

In any of the examples described herein:

The body 74 may comprise a knot.

The swellable material 84 may comprise a coating on each of the filaments 42.

The swellable material 84 may seal between the filaments 42.

The swellable material 84 may prevent fluid flow between the filaments 42.

The filaments 42 may be incorporated into multiple strands of yarn 40.

The strands of yarn 40 may be incorporated into a twine 72, and a knot may be formed in the twine 72.

The yarn 40 may be splayed outward at ends of the twine 72.

A system 10 for use with a subterranean well is also described above. In one example, the system 10 can comprise: a plugging device 70 conveyed by fluid flow into engagement with an opening 80, whereby the plugging device 70 blocks flow through the opening 80. The plugging device 70 in this example comprises multiple filaments 42, each of the multiple filaments 42 being coated with a swellable material 84. The swellable material 84 seals against a surface 80a of the opening 80.

In any of the examples described herein:

The filaments 42 may be incorporated into a body 74 of the plugging device 70.

The body 74 may comprise a knot.

The body 74 may be larger than the opening 80, whereby the body 74 is prevented from passing through the opening 80.

The swellable material 84 may comprise a water-swellable material.

The swellable material 84 may seal between the filaments 42.

The swellable material 84 may prevent fluid flow between the filaments 42.

The filaments 42 may be incorporated into multiple strands of yarn 40.

The strands of yarn 40 may be incorporated into a twine 72, and a knot may be formed in the twine 72.

The yarn 40 may be splayed outward at ends of the twine 72.

The swellable material 84 may reduce a permeability of the plugging device 70.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of constructing a plugging device for use in a subterranean well, the method comprising:
   incorporating multiple filaments into the plugging device; and
   coating each individual filament with a swellable material prior to forming a body of the plugging device.

2. The method of claim 1, in which the incorporating comprises incorporating the filaments into multiple strands of yarn.

3. The method of claim 2, in which the incorporating further comprises forming a twine with the multiple strands of yarn.

4. The method of claim 3, in which the coating comprises coating the filaments after the twine forming.

5. The method of claim 3, further comprising forming a knot in the twine.

6. The method of claim 1, in which the swellable material comprises a water-swellable material.

7. The method of claim 1, in which the swellable material swells in the well.

* * * * *